(12) United States Patent
Kanno et al.

(10) Patent No.: US 10,396,395 B2
(45) Date of Patent: Aug. 27, 2019

(54) SOLID ELECTROLYTE MATERIAL AND METHOD FOR PRODUCING THE SAME

(71) Applicants: TOKYO INSTITUTE OF TECHNOLOGY, Tokyo-to (JP); TOYOTA JIDOSHA KABUSHIKI KAISHA, Toyota-shi, Aichi-ken (JP)

(72) Inventors: Ryoji Kanno, Yokohama (JP); Satoshi Hori, Machida (JP)

(73) Assignees: TOKYO INSTITUTE OF TECHNOLOGY, Tokyo-to (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 1 day.

(21) Appl. No.: 15/937,422

(22) Filed: Mar. 27, 2018

(65) Prior Publication Data

US 2018/0287204 A1 Oct. 4, 2018

(30) Foreign Application Priority Data

Mar. 31, 2017 (JP) ................. 2017-070815
Mar. 8, 2018 (JP) ................. 2018-042355

(51) Int. Cl.

| | |
|---|---|
| *H01M 10/0562* | (2010.01) |
| *H01M 10/052* | (2010.01) |
| *C01B 25/14* | (2006.01) |
| *H01M 10/0525* | (2010.01) |
| *C01B 17/22* | (2006.01) |

(52) U.S. Cl.
CPC ......... *H01M 10/0562* (2013.01); *C01B 17/22* (2013.01); *H01M 10/0525* (2013.01); *C01P 2006/40* (2013.01); *H01M 2300/008* (2013.01); *H01M 2300/0068* (2013.01)

(58) Field of Classification Search
None
See application file for complete search history.

(56) References Cited

U.S. PATENT DOCUMENTS

| | | | |
|---|---|---|---|
| 5,217,826 | A | 6/1993 | Yamamura et al. |
| 6,277,524 | B1 | 8/2001 | Kanno |
| 2016/0149258 | A1 | 5/2016 | Kanno et al. |
| 2017/0155168 | A1 | 6/2017 | Kanno et al. |

FOREIGN PATENT DOCUMENTS

| | | |
|---|---|---|
| JP | H06-070906 A | 3/1994 |
| JP | 3184517 B2 | 7/2001 |
| JP | 3744665 B2 | 2/2006 |
| JP | 2016-027545 A | 2/2016 |
| JP | 2017-033770 A | 2/2017 |
| WO | 2014/196442 A1 | 12/2014 |

OTHER PUBLICATIONS

Kazunori Takada et al; "Lithium ion conductive oxysulfide, Li3PO4-Li3PS4"; Science Direct; Solid State Ionics; vol. 176; 2005; pp. 2355-2359.
Ryoji Kanno et al; "Lithium Ionic Conductor Thio-LISICON"; Journal of the Electrochemical Society; vol. 148; No. 7; 2001; pp. A742-A746.
Masahiro Murayama et al; "Material design of new lithium ionic conductor, thio-LISICON, in the Li2S-P2S5 system"; Science Direct; Solid State Ionics; vol. 107; 2004; pp. 173-180.

*Primary Examiner* — Sarah A. Slifka
(74) *Attorney, Agent, or Firm* — Oliff PLC (57) ABSTRACT

To improve the stability of an electrolyte, among the sulfide solid electrolytes of Li—P—S—X based (X is at least one of F, Cl, N and OH) containing no metal element other than lithium, a new solid electrolyte having a possibility to have high ion conductivity and a method for producing for obtaining the same easily. The disclosure achieves the object by providing a solid electrolyte material including a sulfide composition represented by a composition formula $Li_{4-4y-x-z}P_{1+y-x}P_{5+x}S_{4-z}X_z$ ($Li_{4-4y-x-z}P_{1+y}S_{4-z}X_z$), wherein $0.2 \leq x < 1.0$, $0 \leq z \leq 0.2$, and $0 \leq y \leq 0.075$, and X is at least one of F, Cl, N and OH, and the solid electrolyte material has a peak at a position of $2\theta = 17.8°\pm0.1°$, $19.1°\pm0.1°$, $21.7°\pm0.1°$, $23.8°\pm0.1°$ and $30.85°\pm0.1°$ in X-ray diffraction measurement using a CuKα ray, and method for producing the same.

4 Claims, 4 Drawing Sheets

SOLID ELECTROLYTE MATERIAL AND METHOD FOR PRODUCING THE SAME

TECHNICAL FIELD

The present disclosure relates to a solid electrolyte material and a method for producing the same, particularly, to a solid electrolyte material including a Li element, a P (IV) element, a P (V) element, a S element, and at least one of F, Cl, N, and OH.

BACKGROUND ART

In accordance with higher performance of electronic information apparatuses such as a portable telephone, a notebook personal computer, and a tablet personal computer in recent years, a high performance battery for operating these electronic information apparatus for a long time by a single battery charge is desired. Also, for reducing the greenhouse gases and due to rising gasoline prices, hybrid vehicles and electric vehicles became rapidly widely used so that high power and high capacity batteries for operating the motors loaded on these vehicles are desired. As batteries fulfilling such demands, lithium batteries are mainly used currently.

As electrolytes for lithium batteries, flammable organic solvents are currently used for the reasons such as high ion conductivity, a wide potential window, and low cost. However, since the energy density of the lithium batteries are extremely high, the flammable organic solvents are not preferable in light of safety. In order to further improve the safety of the lithium batteries, flame-resistant materials are desirably used for the electrolytes of the lithium batteries. As such flame-resistant materials, inorganic solid electrolytes attract attention.

As for the inorganic solid electrolyte, there are inorganic electrolytes of amorphia such as nitride, oxide, and sulfide; and of crystalline. The followings are known as the sulfide glass solid electrolyte: a three-component glassy solid electrolyte of lithium sulfide, germanium disulfide, and lithium iodide (Patent Literature 1), and a solid electrolyte wherein lithium phosphate exists in lithium ion conductive sulfide glass represented by a general formula $Li_2$—X (Patent Literature 2). The ion conductivities of these are at a level of $10^{-4}$ S/cm. Further, instead of the amorphia, as the crystalline material, a crystalline material having a tetrahedron basic structure of $SiS_4$, $PO_4$, $PS_4$ or $PN_4$ is being researched in hopes of high ion conductivity, and the ion conductivity in a range of $10^{-3}$ S/cm to $10^{-4}$ S/cm is reported for a $Li_2S$—$GeS_2$—$Ga_2S_3$ based solid electrolyte (Patent Literature 3).

Among the solid electrolytes, as a solid electrolyte with extremely high lithium ion conductivity, a sulfide solid electrolyte called sulfide thio-LISICON (thio-LISICON: LIthium SuperIonic CONductor) is known. Among them, the ion conductivity of $Li_{3.25}Ge_{0.25}P_{0.75}S_4$ is $2.2\times10^{-3}$ S/cm, and is the highest among the sulfide thio-LISICON (for example, refer to Non-Patent Literature 1). Further, in order to improve the stability of electrolytes, Li—P—S based and Li—P—S—O based sulfide solid electrolytes are reported as the sulfide thio-LISICON not including a metal element other than lithium (for example, refer to Non-Patent Literatures 2 and 3).

Patent Literature 4 proposes Li—P—S based sulfide solid electrolyte having a distinguishing X-ray diffraction peak, particularly, having a peak in the vicinity of $2\theta=17.90°$. Also, Patent Literature 5 proposes sulfide solid electrolyte material including a composition of $Li_{5x+2y+3}P^{(III)}_y P^{(V)}_{1-x-y} S_4$, wherein $0\le x\le 0.2$ and $0<y\le 0.3$.

CITATION LIST

Patent Literatures

Patent Literature 1: Publication of Examined Japanese Patent Application No. H06-70906
Patent Literature 2: Japanese Patent No. 3184517
Patent Literature 3: Japanese Patent No. 3744665
Patent Literature 4: Japanese Patent Application Laid-Open (JP-A) No. 2017-033770
Patent Literature 5: WO 2014/196442

Non-Patent Literatures

Non-Patent Literature 1: R. Kanno and M. Murayama, "Lithium Ionic Conductor Thio-LISICON The $Li_2S$—$GeS_2$—$P_2S_5$ System", Journal of The Electrochemical Society, 148 (7), A742-A746 (2001)
Non-Patent Literature 2: M. Murayama, N. Sonoyama, A. Yamada and R. Kanno, "Material design of new lithium ionic conductor, Thio-LISICON, in the $Li_2S$—$P_2S_5$ System", Solid State Ionics, 170, 173-180 (2004)
Non-Patent Literature 3: K. Takeda, M Osada, N. Ohta, T. Inada, A. Kajiyama, H. Sasaki, S. Kondo, M. Watanabe and T Sasaki, "Lithium ion conductive oxysulfide, $Li_3PO_4$—$Li_3PS_4$", Solid State Ionics, 176, 2355-2359 (2005)

SUMMARY OF DISCLOSURE

Technical Problem

However, in light of improving power of the batteries, solid electrolytes having higher ion conductivity and are more stable in battery chemistry are demanded. As mentioned above, for example, a LGPS type sulfide solid electrolyte including Ge is reported to exhibit high ion conductivity; however, higher ion conductivity is demanded, and also, high cost of Ge and low chemical stability such as a reduction-resistance are pointed out. Accordingly, in order to improve the stability of the electrolytes, an object of the present disclosure is to develop, among the Li—P—S—X based (X here is at least one of F, Cl, N and OH) sulfide solid electrolytes containing no metal element other than lithium, a new solid electrolyte having a possibility to have high ion conductivity, and a method for producing for obtaining the same easily.

Solution to Problem

In order to achieve the object, the present disclosure employs the following constitutions.

(1) A solid electrolyte material according to the disclosure of claim 1 comprising a sulfide composition represented by a composition formula $Li_{4-4y-x-z}P^{4+}_{1+y-x}P^{5+}_x S_{4-z}X_z$ ($Li_{4-4y-x-z}P_{1+y}S_{4-z}X_z$), wherein $0.2\le x<1.0$, $0\le z\le 0.2$, and $0\le y\le 0.075$, and X is at least one of F, Cl, N and OH, and the solid electrolyte material has a peak at a position of $2\theta=17.8°\pm0.1°$, $19.1°\pm0.1°$, $21.7°\pm0.1°$, $23.8°\pm0.1°$ and $30.85°\pm0.1°$ in X-ray diffraction measurement using a CuKα ray.

(2) The disclosure of claim 2 is the solid electrolyte material according to claim 1, wherein ion conductivity is 0.4 mS/cm or more.

(3) The disclosure of claim 3 is a method for producing the solid electrolyte material according to claim 1, the method including: an ion conductive material synthesizing step of synthesizing an ion conductive material using a simple substance of P, a P compound, a S compound, and a Li compound as a raw material including a constituent of the sulfide composition; and a heating step of obtaining the sulfide composition by heating the ion conductive material, and at least one of the P compound, the S compound, and the Li compound includes at least one of a fluoride, a chloride, a nitride, and a hydroxide.

(4) The disclosure of claim 4 is the method according to claim 3, wherein a heating temperature in the heating step is in a range of 230° C. to 300° C.

Advantageous Effects of Disclosure

According to the present disclosure, a solid electrolyte material including a Li—P—S—X based sulfide solid electrolyte and a conventionally unknown new crystal structure, and having high ion conductivity and high chemical stability may be obtained easily.

DESCRIPTION OF EMBODIMENTS

As the result of dedicated researches, the present inventors have found out that a solid electrolyte material including a sulfide composition represented by a composition formula $Li_{4-4y-x-z}P^{4+}_{1+y-x}P^{5+}_{x}S_{4-z}X_z$ ($Li_{4-4y-x-z}P_{1+y}S_{4-z}X_z$), wherein $0.2 \leq x < 1.0$, $0 \leq z \leq 0.2$, and $0 \leq y \leq 0.075$ includes a new crystal structure that was not conventionally known; has high ion conductivity and high chemical stability; and may be easily produced. Thereby, the present disclosure has been achieved. Although the present disclosure will be hereinafter described in detail, the present disclosure is not limited to the following embodiments.

<Sulfide Solid Electrolyte>

Figure 1:
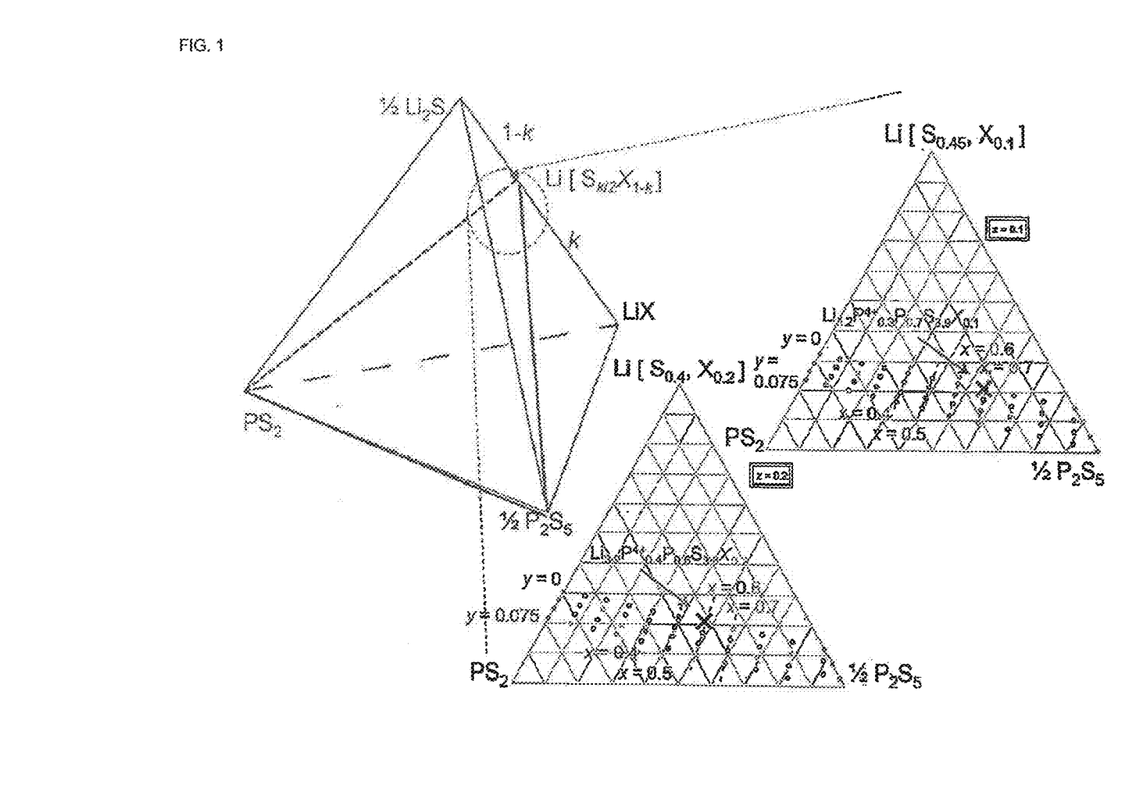
FIG. 1 is a composition diagram of a trigonal pyramid shape of $Li_2S$—$PS_2$—$P_2S_5$—LiX based showing a composition range of the sulfide solid electrolyte in the present disclosure.

The sulfide solid electrolyte (sulfide composition) in the present disclosure will be explained referring to a composition diagram of a trigonal pyramid shape of $Li_2S$—$PS_2$—$P_2S_5$—LiX based shown in FIG. 1. This trigonal pyramid shaped composition diagram is a ternary diagram, when $Li_2S$ is the top apex, having LiX, —$P^{(4+)}S_2$, and $P^{(5+)}_2S_5$ at the apexes of the bottom surface of the trigonal pyramid (a ternary diagram of LiX—$P^{(4+)}S_2$—$P^{(5+)}_2S_5$); the X component increases toward the lower side of the trigonal pyramid (when closer to the bottom surface), and the S component increases toward the upper side of the trigonal pyramid (when closer to the apex $Li_2S$). The sulfide solid electrolyte in the present disclosure has a composition that is plotted inside (excluding sides) the trigonal pyramid, and the composition formula may be represented by $Li_{4-4y-x-z}P^{4+}_{1+y-x}P^{5+}_{x}S_{4-z}X_z$ ($=Li_{4-4y-x-z}P_{1+y}S_{4-z}X_z$). Here, z is a factor relating the ratio of S and X. The case where z=0 corresponds to the left front side surface of the trigonal pyramid (a sulfide ternary diagram of $Li_2S$—$P^{(4+)}S_2$—$P^{(5+)}_2S_5$), and the case where z=1 corresponds to the bottom surface (a ternary diagram of LiX—$P^{(4+)}S_2$—$P^{(5+)}_2S_5$); as z increases from 0, the composition includes more X and the plot in the trigonal pyramid moves toward the bottom surface. Incidentally, k is used instead of z in FIG. 1, and may be replaced as z=1−k (k=1−z). For example, when expressed using z, $Li[S_{k/2}X_{1-k}]$ in FIG. 1 is $Li[S_{(1-z)/2}X_z]$.

The factors x and y will be explained referring to the ternary diagrams (plan views) of Li[S, X]—$PS_2$—$P_2S_5$ system shown in the right side of FIG. 1. These ternary diagrams (plan views) are faces cut out from the trigonal pyramid, and have $P^{(4+)}S_2$, ½$P^{(5+)}_2S_5$ and Li[S, X] at the apexes of the triangles (in detail, z=0.1 or 0.2 and $Li[S_{0.45}X_{0.1}]$ or $Li[S_{0.4}X_{0.2}]$). In these ternary diagrams (plan views), x is a factor relating the ratio of pentavalent P ($P^{5+}$), and will be plotted closer to the apex ½$P^{5+}_2S_5$ (lower right of the ternary diagrams (plan views)), as x increases. Also, y is a factor relating the ratio of tetravalent P ($P^{4+}$), and will be plotted closer to the apex $PS_2$ (lower left of the ternary diagrams (plan views)), as y increases. The composition ratio (4−4y−x−z) of Li is determined by the relationship between x and y.

The sulfide solid electrolyte in the present disclosure is represented by the composition formula $Li_{4-4y-x-z}P^{4+}_{1+y-x}P^{5+}_{x}S_{4-z}X_z$ ($=Li_{4-4y-x-z}P_{1+y}S_{4-z}X_z$), wherein $0.2 \leq x < 1.0$, $0 \leq z \leq 0.2$, and $0 \leq y \leq 0.075$. In other words, a feature of the sulfide solid electrolyte in the present disclosure is that it includes X (at least one of F, Cl, N and OH). For reference, Patent Literature 4 discloses a sulfide solid electrolyte including the composition formula $Li_{3+x'+5y'}P_{1-y'}S_4$; however, this is plotted in the ternary diagram having $Li_2S$, $P_2S_4$, and $P_2S_5$ at the apexes, and does not include X (at least one of F, Cl, N and OH). When it is plotted in the trigonal pyramid of FIG. 1, it is plotted on the left front side surface of the trigonal pyramid, and it is not the composition inside of the trigonal pyramid. That is, the sulfide solid electrolyte in the present disclosure has a composition different from that of, for example, Patent Literature 4. Also, as will be described later, the sulfide solid electrolyte in the present disclosure has a distinguishing X-ray diffraction peak different from that of the sulfide solid electrolyte disclosed in Patent Literature 4.

A feature of the sulfide solid electrolyte in the present disclosure is that it includes X (at least one of F, Cl, N and OH), that is, it includes a halide, a nitride, or a hydroxide. Incidentally, at least a part of the hydroxide may exist as an oxide. The halide, the nitride, the hydroxide, and the oxide may be in a form excellent in chemical stability in some cases so that they improve the chemical stability of the sulfide solid electrolyte in the present disclosure. Also, the sulfide solid electrolyte has a peculiar crystal structure, and is thought that it obtains high ion conductivity due to the peculiar crystal structure such as a tunnel structure through which an ion is able to pass. When a part of S in the crystal structure is substituted with X (at least one of F, Cl, N and OH (or O deriving from OH)), an ion conductivity improving effect may be expected due to the shape change of the tunnel that contributes to the ion conductivity. A range of factor z relating X is in a range of $0 \leq z \leq 0.2$. However, although the substitute amount to S generally increases as the content of X increases, when the content of X is too much, a desired crystal structure may not be obtained in some cases. Accordingly, the lower limit of factor z relating the content of X may be preferably more than 0, more preferably 1 or more, and further preferably more than 1. The upper limit of factor z may be preferably less than 2, more preferably 1.8 or less, or less than 1.8 and further preferably 1.5 or less, or less than 1.5.

The sulfide solid electrolyte in the present disclosure is represented by the composition formula $Li_{4-4y-x-z}P^{4+}{}_{1+y-x}P^{5+}{}_{x}S_{4-z}X_{z}$ ($=Li_{4-4y-x-z}P_{1+y}S_{4-z}X_z$), wherein $0.2 \le x < 1.0$, $0 \le z \le 0.2$, and $0 \le y \le 0.075$.

As for the conventionally known sulfide solid electrolytes, there are a LGPS type crystal structure, an α type crystal structure (crystal structure found in a phase of $Li_3PS_4$), and a β type crystal structure (crystal structure found in β phase of $Li_3PS_4$), and some of these crystal structures are known to have excellent ion conductivity.

In the composition range in the present disclosure, a new crystal structure B different from conventionally known crystal structure has been surprisingly found, and excellent ion conductivity thereof was also confirmed. Hereinafter, the crystal structure B will be explained. Incidentally, the crystal structure may be identified by the peak position in X-ray diffraction measurement using a CuKα ray. The sulfide solid electrolyte in the present disclosure may be in a multiphase state in which a plurality of crystal structures coexist. For example, the composition in the present disclosure may include a LGPS type crystal structure and an α type crystal structure, and overlaps of these peaks may be detected in X-ray diffraction measurement.

The sulfide solid electrolyte in the present disclosure has new crystal structure B different from the conventionally known crystal structure. The new crystal structure B has a peak at a position of $2\theta=17.8°\pm0.1°$, $19.1°\pm0.1°$, $21.7°\pm0.1°$, $23.8°\pm0.1°$ and $30.85°\pm0.1°$ in X-ray diffraction measurement using a CuKα ray.

Figure 4:
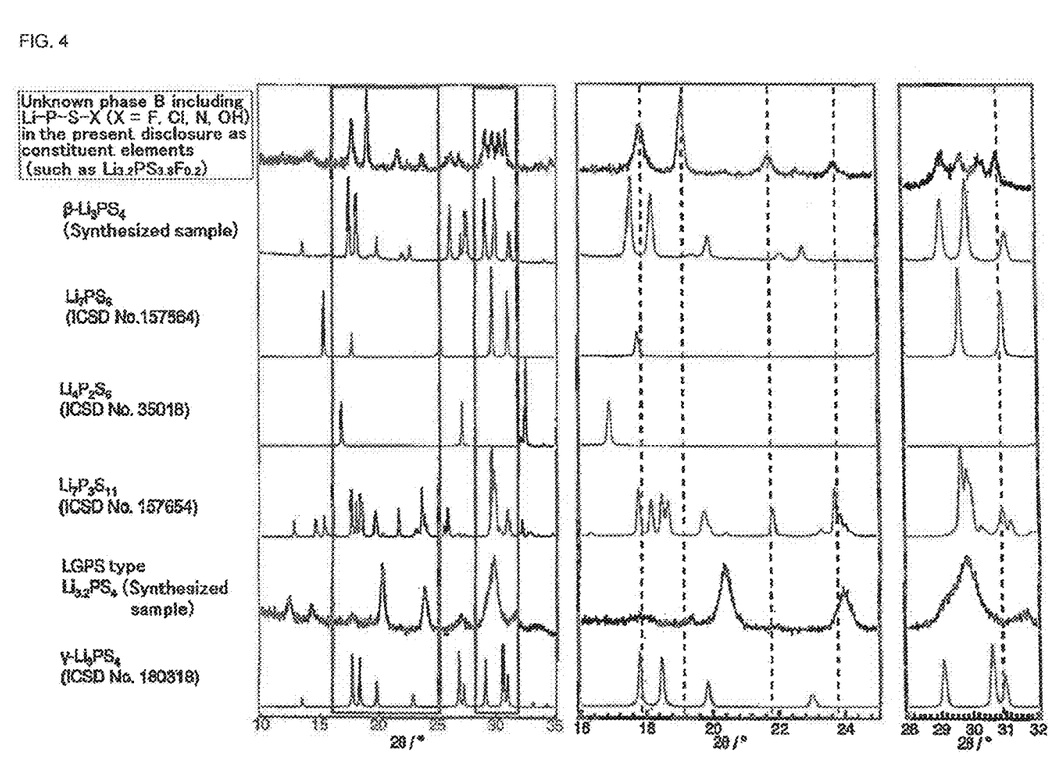
FIG. 4 is a diagram showing the result of an X-ray diffraction peak of a new phase B and the peaks of the known crystal structures, next to each other.

This is different from the above mentioned LGPS type crystal structure, α type crystal structure (crystal structure found in α phase of $Li_3PS_4$), and β type crystal structure (crystal structure found in β phase of $Li_3PS_4$). FIG. 4 shows a comparison of the X-ray diffraction peaks found in the new crystal structure B and the X-ray diffraction peaks found in Li—P—S based solid electrolyte conventionally known to have a crystal structure. From this comparison, it is clear that the new crystal structure B is different from conventionally known crystal structure. The new crystal structure B in the present disclosure particularly has a large peak at the position of $19.1°\pm0.1°$, and other peaks are relatively small. Even when the new crystal structure B is multiphased with other crystal structures so that the small peak of the new phase B is immersed in the peaks of other crystal structures, if the peak of $19.1°\pm0.1°$ clearly project, the existence of the new phase B is suggested.

Here, the peak positions of $2\theta=17.8°$, $19.1°$, $21.7°$, $23.8°$ and $30.85°$ according to the new crystal structure B in the present disclosure are values based on the actual measured values, and the peak positions may slightly vary from the actual measured values (such as $2\theta=17.8°$) due to the slight change of the crystal lattice according to, for example, the material composition. Accordingly, the peaks are defined as the peaks at the position of $17.8°\pm0.1°$, $19.1°\pm0.1°$, $21.7°\pm0.1°$, $23.8°\pm0.1°$ and $30.85°\pm0.1°$ The sulfide solid electrolyte in the present disclosure may have the new crystal structure B, and is expected to have high ion conductivity. The ion conductivity of the sulfide solid electrolyte in the present disclosure may be preferably 0.4 mS/cm or more, more preferably 0.5 mS/cm or more, further preferably 0.6 mS/cm or more, more preferably 0.7 mS/cm or more, more preferably 0.8 mS/cm or more, further preferably 0.9 mS/cm or more, and more preferably 1.0 mS/cm or more.

The measurement of the ion conductivity may be carried out in the following manner.

A pellet is produced by charging the ground sample into a cell for sintered pellet, and then, applying the pressure of approximately 169 MPa to a cell for normal temperature. Then, a sintered pellet including the solid electrolyte material of various compositions is obtained by sintering for 12 hours at 550° C. The sample for measuring is produced so as the radius of the pellet is approximately 10 mm and the thickness is in a range of 1 mm to 2 mm. Au electrodes are stuck together to the sample for measuring to obtain a battery of Au/sample for measuring/Au. A Frequency Response Analyzer manufactured by NF Corporation is used for measuring the ion conductivity of the sample for measuring. The alternating current impedance measurement is carried out to measure the ion conductivity of the sample under the following conditions: the measuring range of 15 MHz to 100 Hz, the measuring temperature of 26° C. to 127° C., the alternating voltage of 50 mV to 100 mV, and the integrating time of 2 seconds.

Since the solid electrolyte material according to the present disclosure has high ion conductivity and high chemical stability, it may be used in any use application requiring ion conductivity and chemical stability. Among the above, the solid electrolyte material according to the present disclosure is preferably used for a battery. This is because it may contribute to the improvement of the battery power greatly. Also, the solid electrolyte material according to the present disclosure is a material including at least a sulfide composition (sulfide solid electrolyte), may include nothing but the sulfide composition (sulfide solid electrolyte), and may further include other compound (such as a binder).

The method for producing the solid electrolyte material according to the present disclosure will be explained. The method for producing the solid electrolyte material according to the present disclosure is a method for producing the solid electrolyte material according to the above described present disclosure, the method including: an ion conductive material synthesizing step of synthesizing an ion conductive material using a simple substance of P, a P compound, a S compound, and a Li compound as a raw material including a constituent of the sulfide composition; and a heating step of obtaining the sulfide composition by heating the ion conductive material.

In the present disclosure, a simple substance of P, a P compound, a S compound, and a Li compound are used as raw materials. The simple substance of P is a pure phosphorus, and the valence of P here is zero valent ($P^0$). The P compound may be, for example, a sulfide (such as $P_2S_5$), a hydroxide (such as $H_3PO_4$), or a nitride chloride (such as $Cl_6N_3P_3$), and the valence of P here is pentavalent ($P^{5+}$). The S compound is a sulfide, may be, for example, a sulfide, a fluoride, or a chloride of other raw material element, and may be, for example, $P_2S_5$, $Li_2S$, $SF_6$, or $SCl_2$. The Li compound may be, for example, a sulfide, a fluoride, a chloride, a nitride, or a hydroxide of other raw material element, and may be, for example, $Li_2S$, $LiF$, $LiCl$, $Li_3N$ or $LiOH$. At least one of the above mentioned compounds includes at least one of a fluoride, a chloride, a nitride, and a hydroxide. Accordingly, the solid electrolyte material according to the present disclosure includes a sulfide solid electrolyte represented by a composition formula $Li_{4-4y-x-z}$ $P^{4+}_{1+y-x}P^{5+}_{x}S_{4-z}X_{z}$ ($Li_{4-4y-x-z}P_{1+y}S_{4-z}X_{z}$) wherein X is at least one of F, Cl, N and OH.

Here, the phosphorus (P) whose valence is zero valent and the phosphorus (P) whose valence is pentavalent are used as the raw materials in the present disclosure. The oxidation-reduction reaction between the pentavalent P and the zero valent P occurs (the pentavalent P is oxidized whereas the zero valent P is reduced) in the ion conductive material synthesizing step and in the heating step, as the result, the quatrovalent P ($P^{4+}$) occurs. By this, the sulfide solid electrolyte (sulfide composition) in the present disclosure includes the quatrovalent P.

Each raw material is preferably used according to the composition ratio so that the sulfide solid electrolyte has a desired composition formula.

The ion conductive material synthesizing step will be explained. In the ion conductive material synthesizing step, the crystallinity of the raw material is firstly deteriorated by micronizing the raw material by the mechanical milling. By once deteriorating the crystallinity of the crystalline raw material, the environment in which the sulfide solid electrolyte with the crystal structure having high electrochemical stability and high ion conductivity is likely to be deposited may be provided. The micronizing is desirably carried out to an extent that the desired peak of the raw material is made broad enough so that the environment in the end objective sulfide solid electrolyte will be the environment in which the crystal phase having the desired peak is likely to be deposited. All of the raw material may be micronized, whereas only a portion may be micronized. Particularly, it is preferable to micronize a compound (such as $Li_2S$) including the Li element. The compound including the Li element has high crystallinity in many cases, and the remaining of such crystalline Li compound may possibly inhibit the deposition of the end objective sulfide solid electrolyte.

Mechanical milling is a method of grinding a raw material while applying a mechanical energy thereto. The raw material is micronized to deteriorate the crystallinity thereof by applying a mechanical energy to the raw material. Examples of such mechanical milling may include vibrating mill, ball mill, turbo mill, mechano-fusion, and disk mill; above all, ball mill and vibrating mill are preferable.

The conditions of ball mill are not particularly limited if the conditions are such as to allow the micronized raw material to be obtained. Generally, larger number of revolutions brings higher micronizing rate, and longer treating time proceeds the micronization. The number of weighing table revolutions in performing planetary ball mill is in a range of 200 rpm to 700 rpm, for example, and preferably in a range of 250 rpm to 600 rpm, above all. Also, the treating time in performing planetary ball mill is in a range of 1 hour to 100 hours, for example, and preferably in a range of 1 hour to 70 hours, above all. Particularly, in order to sufficiently micronizing the compound (such as $Li_2S$) including the Li element, it is preferable to micronize by the ball mill for 10 hours to 40 hours.

The conditions of vibrating mill are not particularly limited if the conditions are such as to allow the micronized raw material to be obtained. The vibration amplitude of vibrating mill is in a range of 5 mm to 15 mm, for example, and preferably in a range of 6 mm to 10 mm above all. The vibration frequency of vibrating mill is in a range of 500 rpm to 2000 rpm, for example, and preferably in a range of 1000 rpm to 1800 rpm above all. The filling factor of a sample of vibrating mill is in a range of 1% by volume to 80% by volume for example; above all, preferably in a range of 5% by volume to 60% by volume, and particularly preferably in a range of 10% by volume to 50% by volume. Also, a vibrator (such as a vibrator made of alumina) is preferably used for vibrating mill. Generally, vibrating mill is inferior to ball mill in grinding efficiency; however, since a compound (such as $P_2S_5$) including the P element is micronized easily compared to the compound (such as $Li_2S$) including the Li element, the micronization by vibrating mill is suitable. The compound (such as $P_2S_5$) including the P element may be sufficiently micronized even by vibrating mill treatment for approximately 30 minutes.

Also, since the simple substance of P (pure phosphorus) is further easily micronized, it may be mixed by hand for approximately 5 minutes.

Next, the amorphized ion conductive material is synthesized by mixing the micronized raw materials.

The ion conductive material is obtained by weighing and mixing the raw materials so that the composition is in the above described preferable composition range.

The amorphized ion conductive material may be synthesized by firstly mixing each micronized raw material by hand, and further, sufficiently mixing by machinery mixing such as ball mill. The various mechanical milling used in the micronization may be used as a machinery mixing method, under the similar conditions. In addition to the micronization, by also utilizing mechanical milling in synthesizing, the amorphized ion conductive material may be synthesized by further deteriorating the crystallinity of the raw material and mixing the raw materials uniformly with each other. For sufficiently mixing, it is preferable to micronizing by ball mill for 10 hours to 40 hours.

The heating step will be explained. The heating step is a step of obtaining the sulfide solid electrolyte according to the present disclosure by heating the amorphized ion conductive material. The crystallinity is improved by heating the amorphized ion conductive material.

The heating temperature is not particularly limited as long as the desired sulfide solid electrolyte may be obtained at the temperature, and the temperature is preferably higher than the temperature at which the sulfide solid electrolyte is crystallized. Specifically, the heating temperature is preferably 230° C. or more, more preferably 240° C. or more, further preferably 250° C. or more, and further more preferably 260° C. or more. Meanwhile the heating temperature is preferably low as possible in light of workability and safety, and specifically, is preferably 500° C. or less, more preferably 400° C. or less, further preferably 350° C. or less, and further preferably 300° C. or less. Incidentally, although Patent Literature 5 discloses Li—P—S based sulfide solid electrolyte material including an oxygen (O), it adds a melting step at 550° C. or more, and compared to this, the sulfide solid electrolyte may be obtained easily in the method for producing according to the present disclosure.

Also, the heating time is preferably adjusted appropriately so that the desired sulfide solid electrolyte may be obtained. The heating time for obtaining the sulfide solid electrolyte according to the present disclosure may be approximately 4 hours, and the sulfide solid electrolyte may be obtained easily. Further, when cooled to the room temperature after the heating, natural cooling may be employed, or annealing may be carried out in order to obtain the desired sulfide solid electrolyte.

In a series of steps for producing the solid electrolyte material, the operations are preferably carried out under an inert gas (such as Ar) atmosphere, in order to prevent the deterioration of the raw material and the obtained solid electrolyte material due to moisture in the air.

EXAMPLES

Hereinafter, the present disclosure will be described in more details with reference to Examples. Incidentally, the following Examples do not limit the present disclosure.

<Production of $Li_{4-4y-x-z}P^{4+}_{1+y-x}P^{5+}_{x}S_{4-z}X_{z}$ Based Sample>

In a glove box under an argon atmosphere, $Li_2S$, LiX, $P_2S_5$, and P (pure phosphorus) were prepared as starting materials. $Li_2S$ and LiX (LiF, LiCl, $Li_3N$ or LiOH) were micronized at 380 rpm by ball mill for 10 hours to 40 hours, $P_2S_5$ was micronized by vibrating mill for 30 minutes, P (pure phosphorus) was ground (micronized) by hand for 5 minutes, and were weighed. A mixed sample was prepared by mixing the micronized raw materials by hand for 5 minutes, and further mixing at 380 rpm by ball mill for 40 hours. A pellet of ϕ13 mm was formed by charging the mixed sample into a pelleter and applying the pressure of 20 MPa to the pelleter using an uniaxial pressing machine. This pellet was sealed into a carbon-coated quartz tube under nearly vacuum of 10 Pa. Then, the temperature of the quartz tube including the pellet was elevated to 230° C. to 290° C. in 2 hours, the temperature was maintained for 4 hours, and then, was naturally cooled. Further, the resultant was ground for the evaluation thereafter.

The composition of the synthesized sample was plotted in the ternary diagram (plan view) in FIG. 1. Each ternary diagram (plan view) in FIG. 1 is that cut out from the composition diagram of a trigonal pyramid shape in FIG. 1, from the side of $PS_2$ and $½P_2S_5$ to the point of Li[S, X] where z=0.1 and z=0.2. Also, in the ternary diagram (plan view) in FIG. 1, guide lines of x and y relating the composition ratio in the composition formula $Li_{4-4y-x-z}P^{4+}_{1+y-x}P^{5+}_{x}S_{4-z}X_{z}$ were shown together.

The measurement and evaluation of power X-ray diffraction and ion conductivity were carried for the obtained samples under the following conditions.

TABLE 1

| Number | Composition | Ball mill (mixting) | Burning |
|---|---|---|---|
| 1 | $Li_{3.2}PS_{3.8}F_{0.2}$ | 380 rpm for 40 hours | 250° C. for 4 hous |
| 2 | $Li_{3.2}PS_{3.9}Cl_{0.1}$ | 380 rpm for 40 hours | 230° C. for 4 hous |
| 3 | $Li_{3.2}PS_{3.9}Cl_{0.1}$ | 380 rpm for 40 hours | 240° C. for 4 hous |
| 4 | $Li_{3.2}PS_{3.9}(OH)_{0.1}$ | 380 rpm for 40 hours | 260° C. for 4 hous |
| 5 | $Li_{3.2}PS_{3.8}F_{0.2}$ | 380 rpm for 40 hours | 260° C. for 4 hous |
| 6 | $Li_{3.2}PS_{3.8}Cl_{0.2}$ | 380 rpm for 40 hours | 260° C. for 4 hous |
| 7 | $Li_{3.2}PS_{3.9}Cl_{0.1}$ | 380 rpm for 40 hours | 260° C. for 4 hous |
| 8 | $Li_{3.6}PS_{3.8}N_{0.2}$ | 380 rpm for 40 hours | 290° C. for 4 hous |
| 9 | $Li_{3.5}PS_{3.9}N_{0.1}$ | 380 rpm for 40 hours | 290° C. for 4 hous |
| 10 | $Li_{3.4}PS_{3.8}N_{0.2}$ | 380 rpm for 40 hours | 290° C. for 4 hous |

<Powder X-Ray Diffraction Measurement>

In order to identify the crystal included in the produced samples a powder X-ray diffraction measurement was carried out by using a powder X-ray diffraction apparatus Ultima-IV (manufactured by Rigaku Corporation) and Smart Lab (manufactured by Rigaku Corporation). For the powder X-ray diffraction measurement, a Cu-Kα ray having the X-ray wavelength of 1.5418 angstrom was used. The powder X-ray diffraction measurement was carried out in a range of 10° to 35° and at step intervals in diffraction angle (2θ) of 0.01°.

<Ion Conductivity Measurement of Sintered Pellet>

A pellet was produced by charging the ground sample into a cell for sintered pellet, and then, applying the pressure of 169 MPa to a cell for normal temperature. Then, a sintered pellet including the solid electrolyte material (sulfide solid electrolyte) of various compositions was obtained by sintering for 12 hours at 550° C. A sample for measuring was produced so as the radius of the pellet was approximately 10 mm and the thickness was in a range of 1 mm to 2 mm. Au electrodes were stuck together to the sample for measuring to obtain a battery of Au/sample for measuring/Au. A Frequency Response Analyzer manufactured by NF Corporation was used for the measuring the ion conductivity of the sample for measuring. The alternating current impedance measurement was carried out to measure the ion conductivity of the sample under the following conditions: the measuring range of 15 MHz to 100 Hz, the measuring temperature of 26° C. to 127° C., the alternating voltage of 50 mV to 100 mV, and the integrating time of 2 seconds. Also, as Comparative Examples, investigations were carried out for the ion conductivity when the solid electrolyte materials that are different from the solid electrolyte material according to the present disclosure were used.

[Evaluation]
<Powder X-Ray Diffraction>

Figure 2:
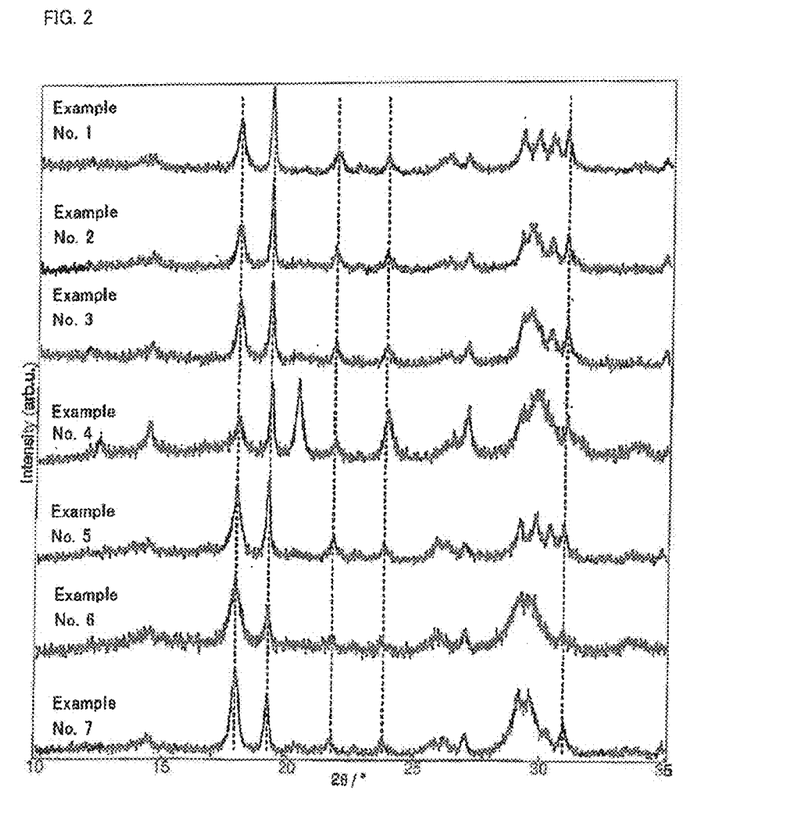
FIG. 2 is an X-ray diffraction diagram of the sulfide solid electrolyte having a composition of $Li_{4-4y-x-z}P^{4+}_{1+y-x}P^{5+}_{x}S_{4-z}X_z$, wherein X is F, Cl, or OH; and a new crystal structure B.
Figure 3:
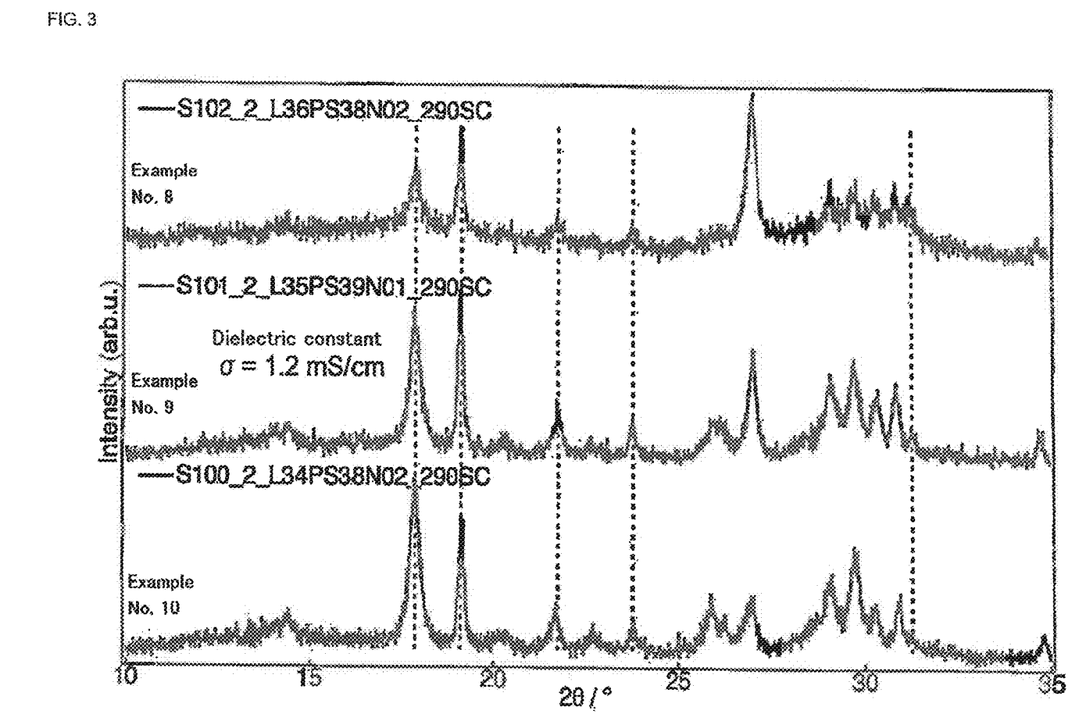
FIG. 3 is an X-ray diffraction diagram of the sulfide solid electrolyte having a composition of $Li_{4-4y-x-z}P^{4+}_{1+y-x}P^{5+}_{x}S_{4-z}X_z$, wherein X is N; and a new crystal structure B.

By using the solid electrolyte material plotted in the ternary diagram (plan view) in FIG. 1, an X-ray diffraction (XRD) measurement was carried out. A part of the results thereof are shown in FIGS. 2 and 3. (In FIG. 2, X=F, Cl or OH, and in FIG. 3, X=N.) For the solid electrolyte materials having the compositions shown in FIGS. 2 and 3, a peak was confirmed at the positions of 2θ=17.8°±0.1°, 19.1°±0.1°, 21.7°±0.1°, 23.8°±0.1° and 30.85°±0.1°, and the possession of the new crystal structure B was suggested.

The new crystal structure according to the present disclosure is different from the conventionally known crystal structures. FIG. 4 is a diagram showing the result of an X-ray diffraction peak of the new phase B and the peaks of the known crystal structures, next to each other. The distinguishing peaks of the new phase B were found at the positions of 2θ=17.8°±0.1°, 19.1°±0.1°, 21.7°±0.1°, 23.8°±0.1° and 30.85°±0.1°. Particularly, the largest peak was located at 19.1°±0.1°, and it was confirmed that it is a peak due to the new crystal structure B of the sulfide solid electrolyte by referring to the later described ion conductivity results, for example.

<Ion Conductivity of Sintered Pellet>

The ion conductivity of the sintered pellets, obtained by sintering the powder of the obtained $Li_{4-4y-x-z}P^{4+}_{1+y-x}P^{5+}_{x}S_{4-z}X_{z}$ based samples, were measured at 26° C. to 127° C. The ion conductivities σ obtained by this were: 0.84 mS/cm for $Li_{3.2}PS_{3.9}(OH)_{0.1}$ of Example #4, 0.91 mS/cm for $Li_{3.2}PS_{3.8}F_{0.2}$ of Example #5, 0.9 mS/cm for $Li_{3.2}PS_{3.8}Cl_{0.2}$ of Example #6, and 1.2 mS/cm for $Li_{3.5}PS_{3.9}Cl_{0.1}$ of Example #9. These are comparable to the ion conductivities reported for the conventional LGPS type solid electrolytes.

What is claimed is:
1. A solid electrolyte material comprising a sulfide composition represented by a composition formula $Li_{4-4y-x-z}P^{4+}_{1+y-x}P^{5+}_{x}S_{4-z}X_{z}$ ($Li_{4-4y-x-z}P_{1-y}S_{4-z}X_{z}$), wherein 0.2≤x<1.0, 0≤z≤0.2, and 0≤y≤0.075, and
X is at least one of F, Cl, N and OH, and
the solid electrolyte material has a peak at a position of 2θ=17.8°±0.1°, 19.1°±0.1°, 21.7°±0.1°, 23.8°±0.1° and 30.85°±0.1° in X-ray diffraction measurement using a CuKα ray.

2. The solid electrolyte material according to claim 1, wherein ion conductivity is 0.4 mS/cm or more.

3. A method for producing the solid electrolyte material according to claim 1, the method comprising:
- an ion conductive material synthesizing step of synthesizing an ion conductive material using a simple substance of P, a P compound, a S compound, and a Li compound as a raw material including a constituent of the sulfide composition; and
- a heating step of obtaining the sulfide composition by heating the ion conductive material, and
- at least one of the P compound, the S compound, and the Li compound includes at least one of a fluoride, a chloride, a nitride, and a hydroxide.

4. The method according to claim 3, wherein a heating temperature in the heating step is in a range of 230° C. to 300° C.

\* \* \* \* \*